(12) United States Patent  
Yamaguchi

(10) Patent No.: US 7,404,894 B2  
(45) Date of Patent: Jul. 29, 2008

(54) PORTABLE WATER CLEANER

(75) Inventor: Masao Yamaguchi, Kiryu (JP)

(73) Assignee: Toyoda Products Co., Ltd. (JP)

( * ) Notice: Subject to any disclaimer, the term of this patent is extended or adjusted under 35 U.S.C. 154(b) by 0 days.

(21) Appl. No.: 11/659,267

(22) PCT Filed: Jul. 11, 2005

(86) PCT No.: PCT/JP2005/012766

§ 371 (c)(1), (2), (4) Date: Feb. 2, 2007

(87) PCT Pub. No.: WO2006/016460

PCT Pub. Date: Feb. 16, 2006

(65) Prior Publication Data

US 2008/0073263 A1    Mar. 27, 2008

(30) Foreign Application Priority Data

Aug. 11, 2004   (JP)   ............................. 2004-234054

(51) Int. Cl.
- *C02F 9/00* (2006.01)
- *C02F 9/02* (2006.01)
- *C02F 9/08* (2006.01)
- *B01D 35/26* (2006.01)
- *B01D 35/02* (2006.01)

(52) U.S. Cl. .................... 210/232; 210/238; 210/257.1; 210/257.2; 210/258; 210/416.3

(58) Field of Classification Search .................. 210/232, 210/238, 257.1, 257.2, 258, 416.3  
See application file for complete search history.

(56) References Cited

U.S. PATENT DOCUMENTS

| 2,473,986 | A | * | 6/1949 | Booth | .......................... 210/228 |
| 3,498,457 | A | * | 3/1970 | Gough | ......................... 210/85 |
| 4,196,081 | A | * | 4/1980 | Pavia | ........................... 210/94 |
| 5,004,535 | A | * | 4/1991 | Bosko et al. | ................... 210/90 |

FOREIGN PATENT DOCUMENTS

| JP | 55-68594 | 5/1980 |
| JP | 61-167991 | 10/1986 |
| JP | 6-253929 | 9/1994 |

(Continued)

OTHER PUBLICATIONS

International Preliminary Report on Patentability for PCT/JP2005/012766 mailed Feb. 22, 2007.

(Continued)

*Primary Examiner*—Thomas M Lithgow  
(74) *Attorney, Agent, or Firm*—Harness, Dickey & Pierce, P.L.C.

(57) ABSTRACT

A carrying case (1) of a portable water cleaner includes a case main body (2) having an opening portion (2a) and forming a container (2b) that contains water, and a lid member (3) that opens/closes the opening portion (2a), and a filtration device (10) which purifies uncleaned water into drinking water is detachably and replaceably housed in the lid member. Further, a pump unit (25) which suctions the uncleaned water contained in the container (2b) and supplies the uncleaned water to the filtration device (10) is provided in the case main body (2).

6 Claims, 5 Drawing Sheets

FOREIGN PATENT DOCUMENTS

| | | |
|---|---|---|
| JP | 9-248559 | 9/1997 |
| JP | 2002-136966 | 5/2002 |
| JP | 2003-311263 | 11/2003 |
| JP | 2005-111341 | 4/2005 |
| KR | 20-0191317 | 5/2000 |

OTHER PUBLICATIONS

International Search Report for PCT/JP2005/012766 dated Sep. 6, 2005.

* cited by examiner

PORTABLE WATER CLEANER

CROSS-REFERENCE TO RELATED APPLICATIONS

This is a U.S. national phase application under 35 USC 371 of International Application PCT/JP2005/012766 (not published in English), filed Jul. 11, 2005. This application claims the benefit of Japanese Application 2004-234054, filed Aug. 11, 2004. The disclosures of the above applications are incorporated herein by reference.

TECHNICAL FIELD

The present invention relates to a portable water cleaner used as an emergency supply to be employed in emergency situations such as earthquakes and floods, or as an outdoor appliance to be employed in camping or the like.

BACKGROUND ART

For emergency situations such as earthquakes and floods, it is common and conventional measures to reserve necessary drinking water such as of tap water in airtight containers such as polyethylene containers.

DISCLOSURE OF THE INVENTION

However, even if reserved in an airtight container made of, for example, polyethylene, tap water becomes rotten in a short period of time, and therefore it cannot be used as drinking water in emergency situations in many cases. In order to maintain the reserved tap water in the container drinkable, it must be periodically replaced with fresh tap water. This replacing work is troublesome and the maintenance cost becomes high. Thus, the conventional measures entail the drawback of being less economic.

The present invention has been achieved in consideration of such a drawback of the conventional technique, and the first object thereof is to provide a portable water cleaner which can make drinking water easily by purifying used water in a bathtub, water from a nearby river, rainwater, etc. as an emergency tool in a situation where it is very hard to obtain drinking water due to the occurrence of an earthquake, flood or the like, or which can make drinking water easily by purifying dirty water from a nearby river, rainwater, etc. as a picnic supply in the case where there is no drinking water nearby in a situation of camping or the like.

The second object of the present invention is to provide a portable water cleaner appropriate as an emergency tool or picnic supply, which can make drinking water easily by a manually driven pumping operation even in such an emergency situation where the supply of electricity is stopped due to the occurrence of an earthquake, flood or the like, or in an outdoor situation where there is no electricity supplied nearby.

The third object of the present invention is to provide a portable water cleaner appropriate as an emergency tool or picnic supply, which can ensure to make drinking water of a high level of water quality even from very dirty water such as muddy water by purifying it.

In order to achieve the first object of the present invention, there is provided a portable water cleaner characterized by comprising: a carrying case including a case main body having an opening portion and forming a container for containing water, and a lid member that opens/closes the opening portion; a filtration device detachably and replaceably housed in the lid member and purifying uncleaned water into drinking water; and a pump unit provided in the main body and suctioning the uncleaned water contained in the container and then supplying the uncleaned water to the filtration device.

In order to achieve the second object of the present invention, there is provided a portable water cleaner characterized in that the pump unit is a hand-operated pump including a manual operation lever, and the manual operation lever is exposed to be operable when the lid member is released from the case main body.

In order to achieve the third object of the present invention, there is provided a portable water cleaner characterized in that the filtration device further comprises a first filtration unit connected to the pump unit via a pump water outlet and a water supplying pipe; a second filtration unit connected to be water-passable to the first filtration unit; and a third filtration unit including a drinking water ejecting pipe and a drain discharge pipe and connected to be water-passable to the second filtration unit, and the first filtration unit is a filtration unit with a built-in filter having a function of eliminating fine particles, the second filtration unit is a filtration unit with a built-in filter having a function of eliminating odors and chlorine, and the third filtration unit is a filtration unit with a built-in filter having a function of eliminating bacteria or the like.

With the portable water cleaner of the present invention, it is possible to make clean drinking water easily by purifying used water in a bathtub, water from a nearby river, rainwater, etc. Thus, unlike the conventional cases, it is no longer necessary to reserve drinking water for emergency situations such as an earthquake, flood and the like, and therefore it is economical. Further, the present invention is able to purify even seawater into clean drinking water, and therefore it is useful when the water cleaner is carried when sailing to sea over a long period of time on a yacht or the like. Further, the main body of the case is made water-proof so that it can be used as a water container. Therefore, it is not necessary to prepare a separate water container necessary for pumping up water when the pump is used, and therefore the utility of the cleaner as an emergency tool.

Meanwhile, in such an emergency situation where the supply of electricity is stopped due to the occurrence of an earthquake, flood or the like, or in an outdoor situation where there is no electricity supplied nearby, drinking water can be made easily with a hand-operated pump by manually driving the pump.

Further, according to the present invention, even in the case where very dirty water such as muddy water, it can be purified into drinking water of a high level of water quality, which is completely free of fine particles, odors, chlorine or microbacteria or the like.

BEST MODE FOR CARRYING OUT THE INVENTION

Figure 1:
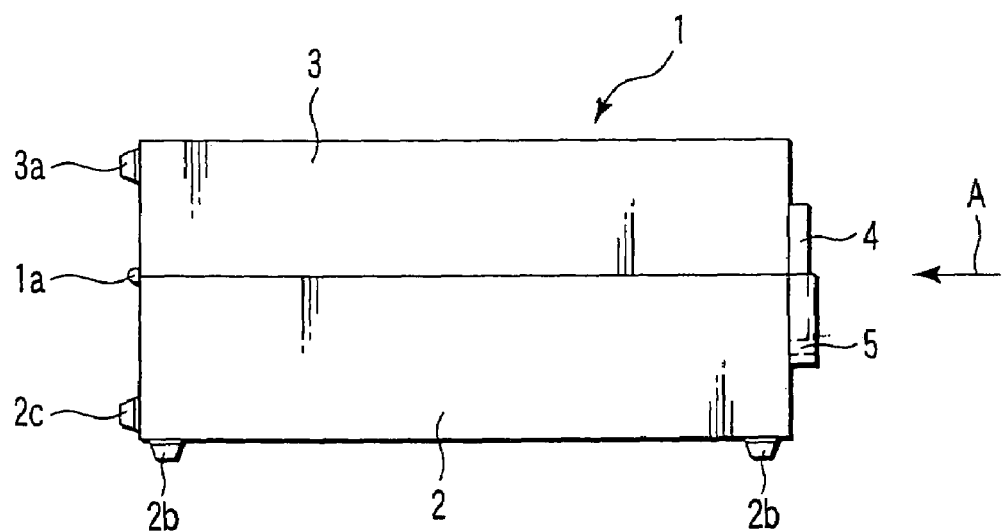
FIG. 1 is a front view of a portable water cleaner with an opening portion closed with a lid member, according to a first embodiment of the present invention.

Embodiments of the present invention will now be described in detail with reference to accompanying drawings.

As shown in FIGS. 1 to 4, a carrying case 1 of the water cleaner has a structure of elongated rectangular box shape, which is air-tightly sealed by a water-proof main body 2 which can be used as a water container and a lid member 3 that is pivotably supported with a hinge portion 1a so that it can be opened or closed with respect to the main body 2. An opening portion 2a is made in the main body 2, and a container 2b whose upper portion is opened is housed inside the main body 2 of the case.

Figure 4:
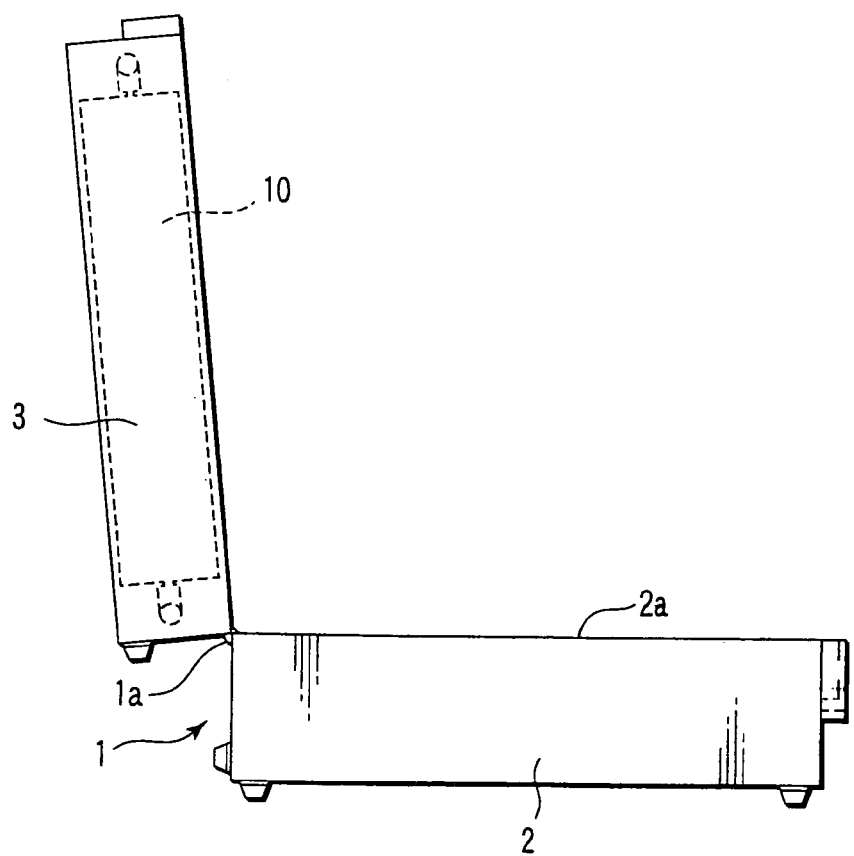
FIG. 4 is a side view taken from the direction indicated by arrow B in FIG. 3.

A plurality of feet 3a are provided on one end surface of the lid member 3, which serves as the bottom surface of the carrying case 1, such as to project from the end surface. A plurality of feet 2c are provided on an outer bottom surface of the main body 2 of the case. A lid engagement stopper 4 and a carriage grip 5 are provided on an upper surface of the carrying case 1 (which is the surface opposite to the side where the feet 3a are provided). When the engagement of the lid engagement stopper 4 is released and the lid member 3 is opened while the carrying case 1 is placed as shown in FIG. 1, the lid member 3 is opened and released from the main body 2 of the case within a range of angle of about 90 degrees and set to stand straight as shown in FIG. 4.

Figure 5:
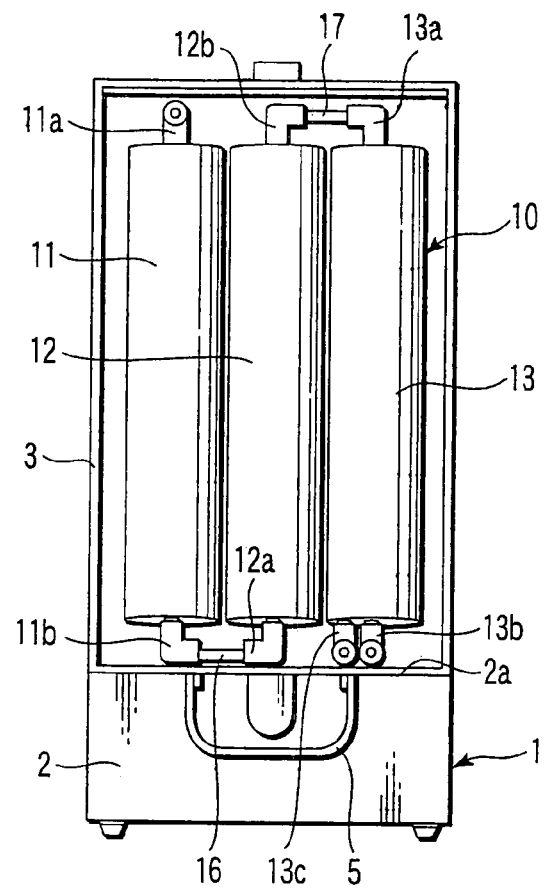
FIG. 5 is a side view taken from the direction indicated by arrow C in FIG. 3.
Figure 6:
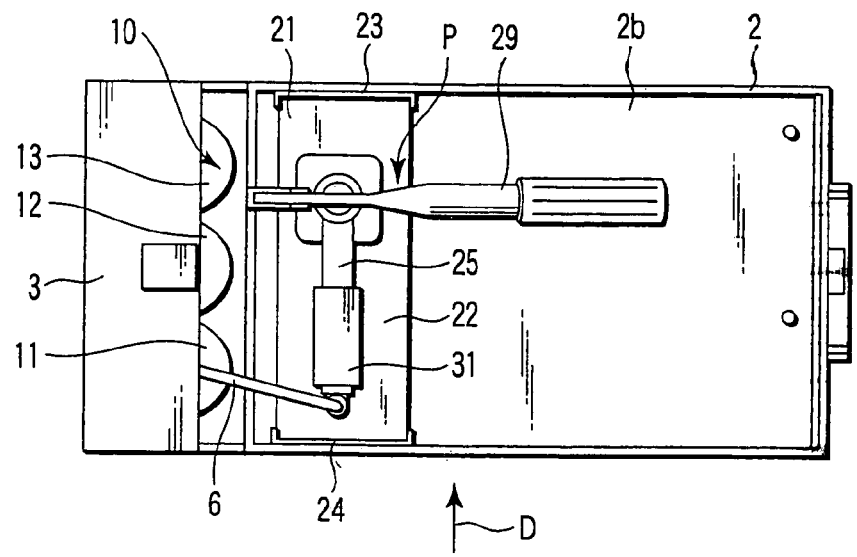
FIG. 6 is a plan view of the portable water cleaner according to the same embodiment while in use.
Figure 7:
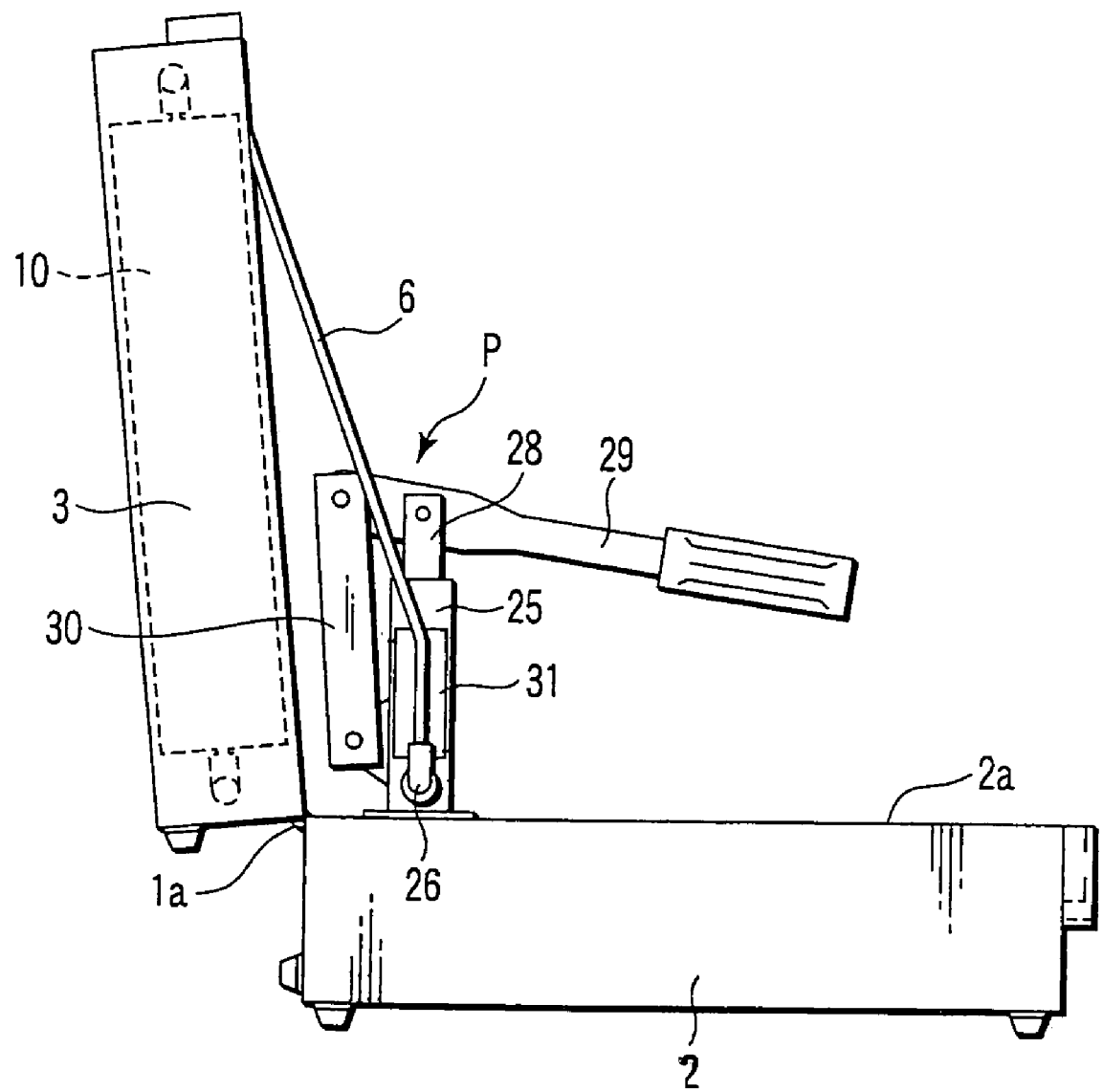
FIG. 7 is a side view taken from the direction indicated by arrow D in FIG. 6.
Figure 8:
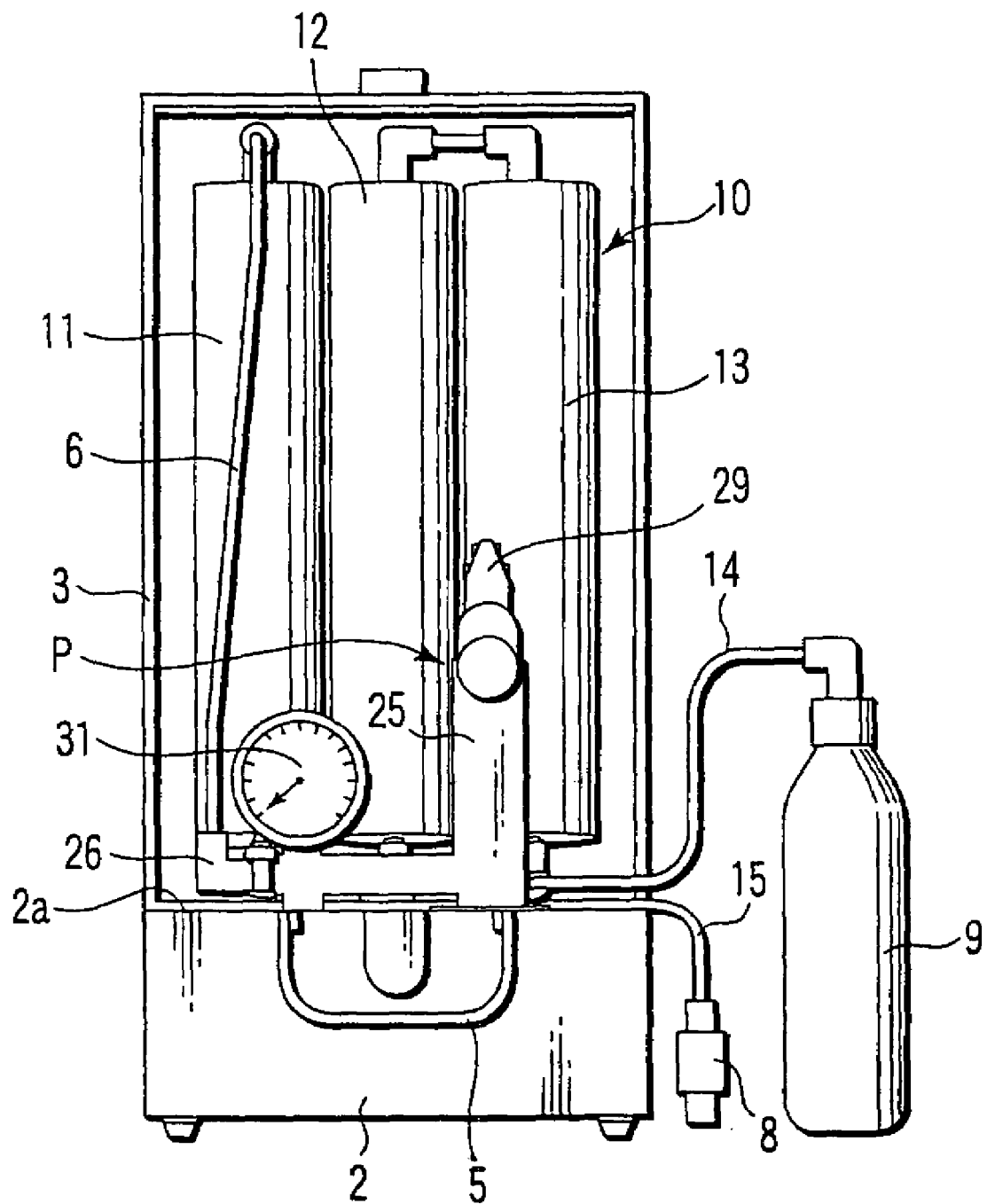
FIG. 8 is a side view of the portable water cleaner according to the same embodiment while in use.

A filtration device 10 is detachably and replaceably mounted in the lid member 3 of the carrying case 1 as shown in FIG. 5 and this device is used to make drinking water by filtrating and purificating dirty water such as used water from a bathtub, water from river, rainwater and muddy water. In this embodiment, the filtration device 10 includes a first filtration unit 11 connected to a pump water outlet 26, which will be later explained, and a flexible water supplying pipe 6 as shown in FIGS. 7 and 8, a second filtration unit 12 connected to be water-passable to the first filtration unit 11, and a third filtration unit 13 including a flexible drinking water ejecting pipe 14 and a flexible drain discharge pipe 15 and connected to be water-passable to the second filtration unit 13.

In more detail, the first filtration unit 11 has an upper end water inlet 11a to which the water supplying pipe 6 is connected, and a lower end water outlet 11b, the second filtration unit 12 has a lower end water inlet 12a and an upper end water outlet 12b, and the third filtration unit 13 has an upper end water inlet 13a, an lower end water cleaning opening 13b and a lower end drain outlet 13c. The lower end water outlet 11b of the first filtration unit 11 is connected in series to the lower end water inlet 12a of the second filtration unit 12 via a water-passable lower pipe 16 as shown in FIG. 5, and the upper end water outlet 12b of the second filtration unit 12 is connected in series to the upper end water inlet 13a of the third filtration unit 13 via a water-passable upper pipe 17. A flexible drinking water outlet pipe 14 is connected to the lower end water cleaning opening 13b of the third filtration unit 13 and a drain discharge pipe 15 is connected to the lower end drain outlet 13c of the third filtration unit 13.

The first filtration unit 11 is a filtration unit equipped with a built-in polypropylene-based filter segment (not shown) having a capability of eliminating micro-particles of 1 micrometer or larger in water. The second filtration unit is a filtration unit equipped with a built-in carbon fixation filter (not shown) having a capability of eliminating odors and chlorine. The third filtration unit is a filtration unit equipped with a built-in reverse osmotic filter (not shown) having a capability of eliminating viruses and bacteria or the like of 0.0001 micrometer or larger. The filtration units 11 to 13 are mounted and attached to within the lid member 3 in such a manner that they are arranged side by side and adjacent ones are connected as shown in FIG. 5. It should be noted that the filtration device 10 is not limited to that of this embodiment, which consists of 3 filtration units 11 to 13 as described above, but alternatively it may be of a single filtration unit that has similar filtration capabilities to those can be achieved by the three filtration units 11 to 13.

Figure 3:
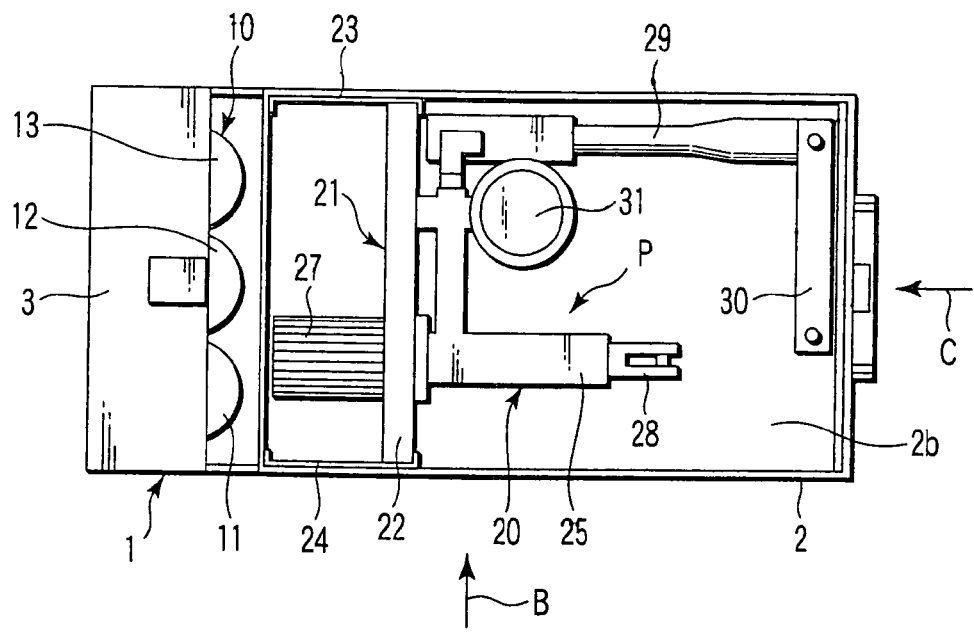
FIG. 3 is a plan view of the portable water cleaner with the lid member released from the opening, according to the same embodiment.

As shown in FIG. 3, a pump unit 20 is housed in the main body of the case and it serves to suction dirty water contained in the main body 2 and supply it to the filtration device 10. In this embodiment, the pump unit 20 includes a pump table 21 that can be housed in the main body 2 of the case and a hand-operated pump P mounted to the pump table 21. The pump table 21 includes a pump table plate 22 and leg plates 23 and 24 mounted on respective ends of the pump table plate 22, and it has a gate shape as shown in FIG. 3. The width of the pump table plate 22 is set substantially the same as the depth of the main body 2 of the case, and the length of the leg plates 23 and 24 is set substantially the same as the depth of the main body 2 of the case. With this structure, the pump table 21 is removably housed in the main body 2 of the case in such a state that it is laid as shown in FIG. 3, so that it does not project out from the opening portion 2a.

As shown in FIGS. 7 and 8, the hand-operated pump P includes a main body 25 of the pump which is fixed onto the pump table plate 22. The main body has a pump water outlet 26 and an uncleaned water suction inlet 27 which projects downward from the pump table plate 22 as shown in FIG. 3. A hand-operated lever 29 is pivotally jointed to a piston neck 28 of the main body 25 of the pump with a stopper such as a wing nut so that the lever can be detached. An interlock lever 30 is detachably jointed with a stopper such as a wing nut to an outer circumferential bracket portion of the main body 25 of the pump in such a manner that one end of the lever 30 is pivotally fixed thereto and the other end is pivotally connected to a distal end portion of the hand-operated lever 29. Further, a pressure gauge 31 is provided to measure the pressure of water supplied by the hand-operated pump P.

Figure 2:
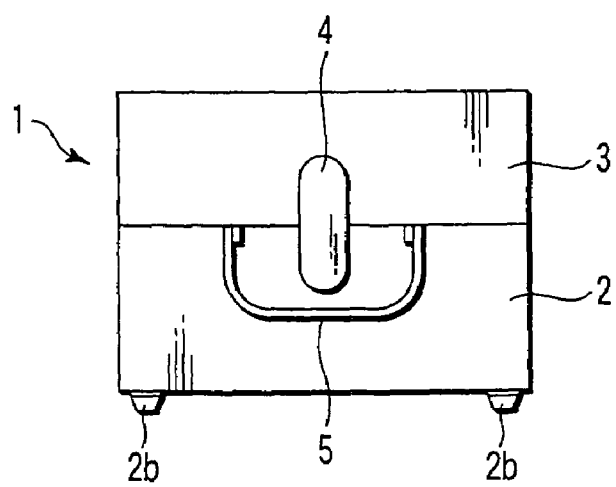
FIG. 2 is a side view taken from the direction indicated by arrow A in FIG. 1.

When the cleaner is not in use, the hand-operated lever 29 of the pump P and the interlock lever 30 are removed from the main body 25 of the pump, and the pump unit 20 is housed in the case main body 2 in such a position that it is laid down as shown in FIG. 3. Thus, the carrying case 1 can be stored as an emergency tool while the lid member 3 is closed as shown in FIGS. 1 and 2.

When in emergency situations where drinking water is necessary (when the pump should be used), the lid member 3 of the carrying case 1 is opened as shown in FIG. 4, and the pump unit 20 is taken out from the main body 25 of the case while the case is opened. Then, the pump unit 20 is set to stand straight to project upwards from the opening portion 2a of the main body 25 of the case as shown in FIG. 7, and the hand-operated lever 29 and the interlock lever 30, which are detached and stored in the case, are mounted to the main body 25 of the pump. Thus, the clear is ready for use.

When actually using the cleaner, used water in a bathtub, dirty water from a nearby river, rainwater or the like is collected with a bucket or the like, and poured into the container 2b of the main body 2 of the case to almost fill it up. Then, the hand-operated lever 29 of the pump P is manually driven to draw up the uncleaned water in the container 2b and then pass it through the filtration device 10 for filtration. FIG. 8 further shows a drain discharge outlet 9 mounted to an end of the drain discharge pipe 15 and a drinking water container such as of a PET bottle, which reserves drinking water poured from the drinking water ejecting pipe 14.

This embodiment was explained in connection with the case where the pump unit 20 includes the pump table 21 that can be housed in the main body 2 of the case and the hand-operated pump P mounted to the pump table 21, but the present invention is not limited to the above-described structure, but it is possible to apply an electrically driven pump in place of the hand-operated pump P. The water cleaner of the present invention can be used in situations where there is no drinking water even with use of such an electrically driven pump.

Lastly, the present invention is not limited to the embodiment described above as it is, but it can be realized by modifying the structural elements into various versions as long as the essence of the invention remains within the scope of the invention. Further, various versions of the present invention can be realized by appropriately combining some of the structural elements disclosed in the above-provided embodiment. For example, some of the structural elements may be deleted from the entire structure presented in the embodiment, or structural elements from different examples may be combined together.

INDUSTRIAL APPLICABILITY

The portable water cleaner of the present invention may be installed as an emergency tool not only in ordinary households, schools, companies, etc, but also in fire stations so that it can be used in emergency situations such as wide-area earthquake disasters, wide-area flood disasters, etc. Or, the present invention can be applied to an outdoor tool that is carried to fields, mountains, seas or the like. Further, the present invention is able to purify even seawater into clean drinking water, and therefore it is useful when the water cleaner is carried when sailing to sea over a long period of time on a yacht or the like.

The invention claimed is:

1. A portable water cleaner characterized by comprising:
a carrying case including a case main body having an opening portion and forming a container that contains water, and a lid member that opens/closes the opening portion;
a filtration device detachably and replaceably housed in the lid member, which purifies uncleaned water into drinking water; and
a pump unit provided in the main body, which suctions the uncleaned water contained in the container and supplies the uncleaned water to the filtration device.

2. The portable water cleaner according to claim 1, characterized in that the carrying case further comprises a carrier grip, and the filtration device and the pump unit are housed inside when the lid member is closed to the case main body.

3. The portable water cleaner according to claim 1 or 2, characterized in that the carrying case further comprises a hinge portion that pivots the lid member to be openable/closable with respect to the case main body, and when the case main body is position to set the opening portion thereof face upwards, the uncleaned water is contained in the container and when the lid member is closed to the case main body, the cleaner can be carried by holding the carrier grip.

4. The portable water cleaner according to claim 1 or 2, characterized in that the pump unit is a hand-operated pump including a manual operation lever, and the manual operation lever is exposed to be operable when the lid member is released from the case main body.

5. The portable water cleaner according to claim 1 or 2, characterized in that the pump unit further comprises a pump table storable within the case main body, a hand-operated pump mounted to the pump table, a hand-operated lever and an interlock lever, and when the pump is not in use, the pump unit is stored within the case main body while being laid down with the hand-operated lever of the hand-operated pump, and the interlock lever being detached from the main body of the pump, and when the pump is to be used, the hand-operated lever of the hand-operated pump, and the interlock lever are attached to the main body of the pump to use the pump unit.

6. The portable water cleaner according to claim 1, characterized in that the filtration device further comprises a first filtration unit connected to a pump water outlet of the pump unit via a water supplying pipe; a second filtration unit connected to be water-passable to the first filtration unit; and a third filtration unit including a drinking water ejecting pipe and a drain discharge pipe and connected to be water-passable to the second filtration unit, and the first filtration unit is a filtration unit with a built-in filter having a function of eliminating fine particles, the second filtration unit is a filtration unit with a built-in filter having a function of eliminating odors and chlorine, and the third filtration unit is a filtration unit with a built-in filter having a function of eliminating bacteria or the like.

* * * * *